(12) United States Patent
Ribich

(10) Patent No.: US 8,581,546 B2
(45) Date of Patent: *Nov. 12, 2013

(54) METHOD AND APPARATUS FOR CONVERTING DIRTY ELECTRICAL POWER TO A CLEAN ELECTRICAL POWER SUITABLE FOR A PORTABLE ELECTRONIC FLIGHT BAG IN AN AIRCRAFT

(76) Inventor: Richard Luke Ribich, Maumelle, AR (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/224,111

(22) Filed: Sep. 1, 2011

(65) Prior Publication Data

US 2013/0057216 A1    Mar. 7, 2013

(51) Int. Cl.
*H01M 10/44* (2006.01)
*H01M 10/46* (2006.01)

(52) U.S. Cl.
USPC .......................................................... 320/114

(58) Field of Classification Search
USPC .............. 320/104, 107, 114, 115; 714/14, 22; 307/66; 323/276, 285
See application file for complete search history.

(56) References Cited

U.S. PATENT DOCUMENTS

2002/0199131 A1* 12/2002 Kocin ............................ 714/14

OTHER PUBLICATIONS

Avionics & Systems Integration Group (ASIG), "EmPower: In-Seat Power Supply & Outlets," Product: 110 Volt AC Outlet Unit, www.ASIGLLC.com, 2 pages.

* cited by examiner

*Primary Examiner* — Edward Tso (57) ABSTRACT

Provided is an apparatus. The apparatus includes a power conditioning module. The power conditioning module includes an input that is operable to receive a first power from an aircraft. The power conditioning module includes electronic circuitry that is operable to transform the first power to a second power. The second power is different from the first power and is suitable for charging a portable electronic device. The power conditioning module includes a status indication mechanism that is operable to indicate a status of the power conditioning module.

20 Claims, 14 Drawing Sheets

METHOD AND APPARATUS FOR CONVERTING DIRTY ELECTRICAL POWER TO A CLEAN ELECTRICAL POWER SUITABLE FOR A PORTABLE ELECTRONIC FLIGHT BAG IN AN AIRCRAFT

TECHNICAL FIELD

The present disclosure generally relates to power regulation, and more particularly, to a voltage regulator that is operable to provide power to portable electronic devices aboard an aircraft.

BACKGROUND

In the field of avionics, pilots have traditionally relied on flight bags to help them navigate the aircraft they operate. These flight bags may contain flight-related documents such as aircraft operation manuals, navigation charts, company policies, checklists, and information related to the trip, etc. The flight bags are typically heavy and may weigh as much as forty or fifty pounds. Such heavy weight of the flight bags makes them inconvenient for pilots or flight crew, who have to carry these heavy bags with them to the cockpit of an aircraft on every trip they take.

In recent years, the rapid advancement in computer and networking technologies has led to the development of electronic flight bags (EFB). These electronic flight bags include electronic devices that store the information contained in a traditional flight bag in a digital format. However, to ensure the aircraft's operational safety, governmental rules and regulations have placed stringent requirements on the electronic flight bags. For example, there are stringent requirements regarding the way in which power is supplied to an electronic flight bag. Existing electronic flight bags have not adequately addressed these issues.

Therefore, while existing electronic flight bags have been generally adequate for their intended purposes, they have not been entirely satisfactory in every aspect.

SUMMARY

One of the broader forms of the present disclosure involves an apparatus. The apparatus includes a power conditioning module. The power conditioning module includes: an input that is operable to receive a first power from an aircraft; electronic circuitry that is operable to transform the first power to a second power, wherein the second power is different from the first power and is suitable for charging a portable electronic device; and a status indication mechanism that is operable to indicate a status of the power conditioning module.

Another one of the broader forms of the present disclosure involves a method. The method includes: receiving, using a power conditioning module, a first power from an aircraft; converting, using the power conditioning module, the first power to a second power, wherein the second power is different from the first power and is suitable for charging a portable electronic device; monitoring a fault condition of the power conditioning module; and displaying the fault condition through a light-emitting diode (LED) panel.

Yet another one of the broader forms of the present disclosure involves a power conditioning system. The power conditioning system includes: input means for receiving a first power from an aircraft; electronic circuitry means for transforming the first power to a second power, wherein the second power is different from the first power and is suitable for charging a portable electronic device; and display means for displaying a status of the power conditioning module.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designation have the same or similar functions.

DETAILED DESCRIPTION

It is to be understood that the following disclosure provides many different embodiments, or examples, for implementing different features of the invention. Specific examples of components and arrangements are described below to simplify the present disclosure. These are, of course, merely examples and are not intended to be limiting. Various features may be arbitrarily drawn in different scales for simplicity and clarity.

Traditionally, flight crews have been carrying flight bags onboard aircrafts. These flight bags include flight-related documents such as flight manuals, company policies, checklists, and information related to the trip, etc. The flight bags can be very heavy, which makes their transportation inconvenient and cumbersome for flight crews.

In recent years, electronic flight bags (EFB) have been proposed and implemented to replace the traditional flight bags. These electronic flight bags include electronic devices that can digitally store the information contained in a traditional flight bag. Since a large amount of information can be stored in a relatively small electronic device, the electronic flight bags weigh much less than traditional flight bags containing paper documents. The elimination of the paper documents may also result in cost savings. In addition, it may be easier for an operator to manage and manipulate flight information electronically using the electronic flight bag.

To ensure the aircraft's operational safety, governmental rules and regulations have placed stringent requirements on various operational aspects of electronic flight bags. One of these requirements deals with the way in which power is supplied to an electronic flight bag. For example, the power supplied must be "clean" and free of spikes. This may not be feasible for existing power supplies inside the cockpit, which may be generated by a motor. Depending on the speed, age, and health of the motor, or the serviceability of the interconnect wiring, the power produced by the motor may have significant variations and as such may be too "dirty" to supply power to an electronic flight bag directly.

Figure 1:
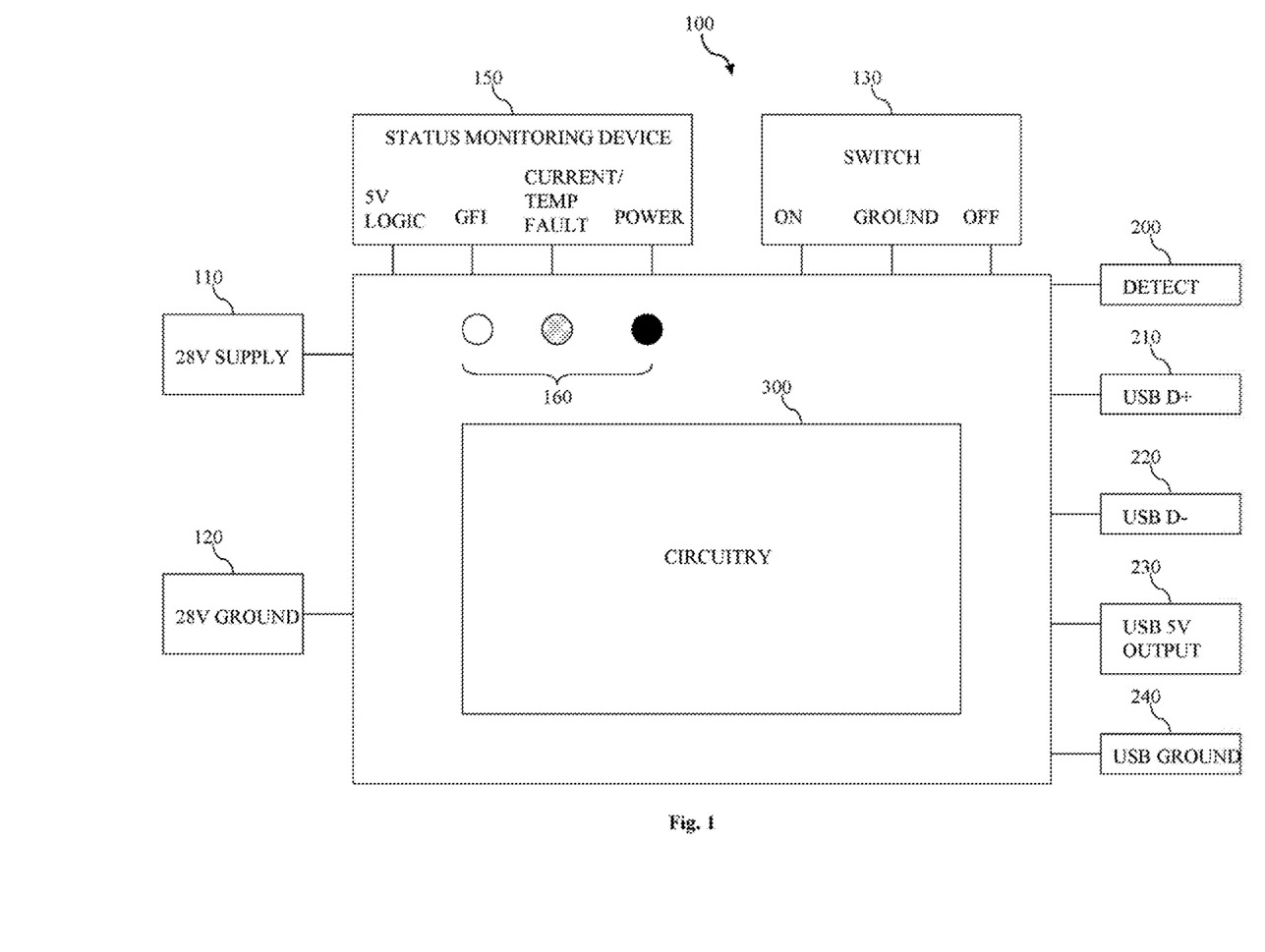
FIG. 1 is a simplified block diagram of a power conditioning module according to various aspects of the present disclosure.

The present disclosure provides a power conditioning module that can be used to deliver power from an existing power source on an aircraft to a portable electronic device that can be used as an electronic flight bag. FIG. 1 is a simplified functional block diagram of the power conditioning module 100 according to various aspects of the present disclosure. The power conditioning module 100 includes a printed circuit board (PCB) assembly packaged with an enclosure. In other words, the power conditioning module 100 may contain a PCB card.

In an embodiment, the power conditioning module 100 is operable to convert an unregulated direct-current (DC) input voltage to a regulated DC output voltage. In an embodiment, the unregulated DC input voltage is a voltage supplied by an existing power bus onboard an aircraft, which may be a 28 volt (V) nominal voltage. In operation, the 28V nominal voltage may vary from about 27V to about 29V. In an embodiment, the regulated output voltage is about 5V, with current up to about 2.1 amperes (A). The regulated output can then be used to supply power to a portable electronic device. In an embodiment, the portable electronic device is a computer tablet device. For example, the computer tablet device may be an Apple iPad® device serving as an electronic flight bag. It is understood, however, that other suitable personal electronic devices may be powered up by the power conditioning module 100 in alternative embodiments.

Referring to FIG. 1, the power conditioning module 100 is coupled to a 28V power source 110 and a 28V ground 120. The 28V power source 110 provides the 28V DC power onboard an aircraft (e.g., inside the cockpit of the aircraft). The 28V ground provides a ground return for that power. As discussed above, this 28V power source may be dirty and may have significant voltage fluctuations or spikes. Thus, the power conditioning module 100 is designed to have buffers and other interface circuitry that can handle these voltage fluctuations and spikes. In an embodiment, the power conditioning module 100 has an input tolerance of about 3%. The 28V supply 110 and the 28V ground 120 may be considered inputs to the power conditioning module 100.

The power conditioning module 100 includes a switch 130. In an embodiment, the switch 130 is an external single-pole, double-throw momentary. The switch 130 includes contacts that are normally open. Pushing the switch 130 to an "on" position commands the power conditioning module 100 to turn on by connecting its center terminal to an on-wire. Pushing the switch 130 to the "off" position commands the power conditioning module 100 to turn off by connecting its center terminal to an off-wire. The switch 130 mechanically returns to a center unconnected position when it is released. Latching the on/off state of the power conditioning module 100 is electronic internal to the regulator.

When a current output exceeds a predetermined threshold, for example 2.1 A, an over-current condition is created. When this happens, the power conditioning module 100 is configured to automatically shut off the output voltage for an interval of time. In an embodiment, this interval of time is about one second. Thereafter, the power conditioning module 100 re-enables the output to again test for the over-current condition. The power conditioning module 100 may continuously repeat the cycle described above until the current output falls within the predetermined threshold, or until the power conditioning module 100 is turned off.

When a temperature exceeds a predetermined threshold, for example 140 degrees Fahrenheit, an over-temperature condition is created. When this happens, the power conditioning module 100 is configured to enter an over-temperature mode and shuts the output off. The power conditioning module 100 remains in the over-temperature mode until the temperature falls within the threshold temperature. In an embodiment, the over-temperature mode is cleared when the temperature is below 130 degrees Fahrenheit.

The power conditioning module 100 is protected by a Ground-Fault Circuit Interrupters (GFCI) circuit feature internal to the power conditioning module 100. The power conditioning module measures a return current and compares it to the output current to determine if there is a current path to vehicle ground. The power conditioning module 100 enters a ground-fault mode if current leakage is found to exceed a predetermined threshold, for example in excess of about 500 milli-amperes (mA). After a ground-fault event has triggered, the power conditioning module 100 electrically switches its output off until the power switch is operated to cycle the power back on.

The power conditioning module 100 includes a status monitoring device 150. The status monitoring device 150 is configured and operable to monitor the status of the power conditioning module 100. In an embodiment, the status monitoring device 150 includes a light-emitting diode (LED) module 160. The LED module 160 includes an LED panel containing a plurality of LED indicators of different colors, each one of which is illuminated to indicate a particular condition. The enclosure of the power conditioning module 100 may include a light pipe to conduct the LED light to the outside of the enclosure. The operation of the LED indicators is exclusive in that there may only be one LED indicator active at a time.

In an embodiment, the LED module 160 includes a green LED indicator, a yellow LED indicator, and a red LED indicator. The green LED indicator illuminates when the power conditioning module 100 senses a steady 28V DC input and is powered on with no over-current, over-temperature, or ground-fault situations; and detects a suitable load on the circuit from the Electronic flight bag device. In other words, the power conditioning module 100 is functioning properly as desired. The yellow LED indicator illuminates when the power conditioning module detects an over-temperature or over-current situation. The red LED indicator illuminates when the power conditioning module detects a ground-fault situation.

The power conditioning module 100 includes a detect pin 200. The detect pin 200 is configured to identify itself to the portable electronic device attached thereto. In an embodiment where the portable electronic device is an iPad, the detect pin 200 is operable to identify the power conditioning module as a power accessory to the iPad.

The power conditioning module 100 includes a Universal Serial Bus (USB) Data+ pin 210 and an USB Data− pin 220. The USB Data+ pin 210 and the USB Data− pin 220 each have an USB interface and serve as data pins herein. The USB Data+ pin 210 and the USB Data− pin 220 are configured to give feedback to the power conditioning module 100 such that the power conditioning module 100 cannot be turned on and energized if there is no load (i.e., the portable electronic device) present. In other embodiments, it is contemplated that these data pins may have alternative communication interfaces different from USB.

The power conditioning module 100 includes an USB 5V data output pin 230 and an USB ground pin 240. The USB 5V data output pin 230 is configured to deliver a steady clean supply voltage (e.g., free of fluctuations or spikes) to the portable electronic device attached thereto. Stated differently, the USB 5V data output pin 230 provides a charging voltage. In an embodiment, the voltage delivered is within 3% of 5V (4.85V to 5.15V). The USB ground pin 240 serves as electrical ground for the power output pin 230. In other embodiments, it is contemplated that the pins 230 and 240 may have alternative communication interfaces different from USB.

According to an embodiment, the following procedure may be employed to operate the power conditioning module 100. First, a 28V power is provided to the power conditioning module 100 through the 28V supply 110. Momentary contact of the on switch 130 initiates a sequence that tests for acceptable conditions, then applies a 5V power to the USB 5V output pin 230 if conditions are within predetermined limits. These following conditions must be met:
1. The detect pin 200 must be grounded by the attachment of the portable electronic device attached thereto.
2. Temperature must be below 140 degrees Fahrenheit.

After powering on, the current must remain below 2.3 A, and the current difference between the two terminals must remain below 500 mA. If current exceeds the limit, this condition is latched as a current fault. The 5V output is disabled for approximately one second, and is then re-enabled. If the current is still over limit, then the board continues to cycle off, testing the current until the current detected is consistently less than the limit.

If the current difference between the USB 5V output pin 230 and the USB ground pin 240 is greater than 500 mA, then a Ground Fault Interrupter (GFI) condition is latched. In an embodiment, this condition can be cleared by removing the 28V power from the input. In other embodiments, this condition may be cleared by operating the switch off and then back on.

During the operation of the power conditioning module 100, the green LED indicator is illuminated if the following conditions are met:
  Adequate power is provided from the input (e.g., from the 28V supply 110)
  A suitable load is detected on the output (e.g., a functioning Apple iPad device)
  No over-temperature condition is detected (e.g., temperature should be kept under 140 degrees Fahrenheit)
  No over-current condition is detected
  No under-current condition is detected
  No over-voltage condition is detected
  No under-voltage condition is detected
  No GFI condition is detected Thus, the illumination of the green LED indicator means that everything is working properly, and no operator action needs to be taken. One the other hand, the yellow LED indicator is illuminated if an over-temperature condition is detected, or if an over/under current/voltage condition is detected. The presence of these conditions means that the power conditioning module 100 is not functioning properly, and that the operator needs to take actions to ensure the power conditioning module 100 returns to a fully functional state.

Lastly, the red LED indicator is illuminated when a GFI condition is detected. The GFI condition is considered an absolute hard fault. For example, it may indicate that there is a direct short circuit to the aircraft frame's ground, which presents a threat to the airplane, the crew, and the passengers. The GFI fault is not momentarily resettable. The GFI condition shuts down the power conditioning module. The power conditioning module cannot be powered back on until the load device is disengaged, the power conditioning module 100 is turned off, and the GFI fault is cleared. Afterwards, the load is re-engaged, and the power conditioning module 100 is turned on again.

The enclosure of the power conditioning module may have more than one form factor. In one embodiment, the form factor of the enclosure is a box-enclosed mount with a D subconnector on the side. It is a permanently mounted piece of avionics on the aircraft. In this case, the power conditioning module (including the enclosure) itself and its installation on the aircraft have to be approved by the necessary governmental agencies such as the Federal Aviation Administration (FAA).

In another embodiment, the form factor of the enclosure is a portable dongle. Out of one side is a coil cable that goes to a 3-pin circular connector that can be connected to a cabin cockpit bulkhead connector in the side wall, and the other side of the enclosure has a connector configured to be coupled to the portable electronic device. In the embodiment where the portable electronic device is the Apple iPad, the connector coming out of the enclosure is a 30-pin connector configured to be coupled to the iPad. The portable dongle form factor allows the power conditioning module 100 to be transported from aircraft to aircraft.

The power conditioning module 100 contains circuitry 300 that is implemented within either of the enclosure form factors discussed above. The circuitry 300 may be implemented on a PCB board or a card. The circuitry 300 is designed and implemented to carry out the various functionalities of the power conditioning module 100 discussed above. It is understood, however, that the circuitry 300 may overlap with the various components 110-240 described above in association with FIG. 1. That is, one or more of these components 110-240 may be implemented at least partially within the circuitry 300 in some embodiments, and that the circuitry 300 and the components 110-240 are not mutually exclusive of one another.

Figure 2:
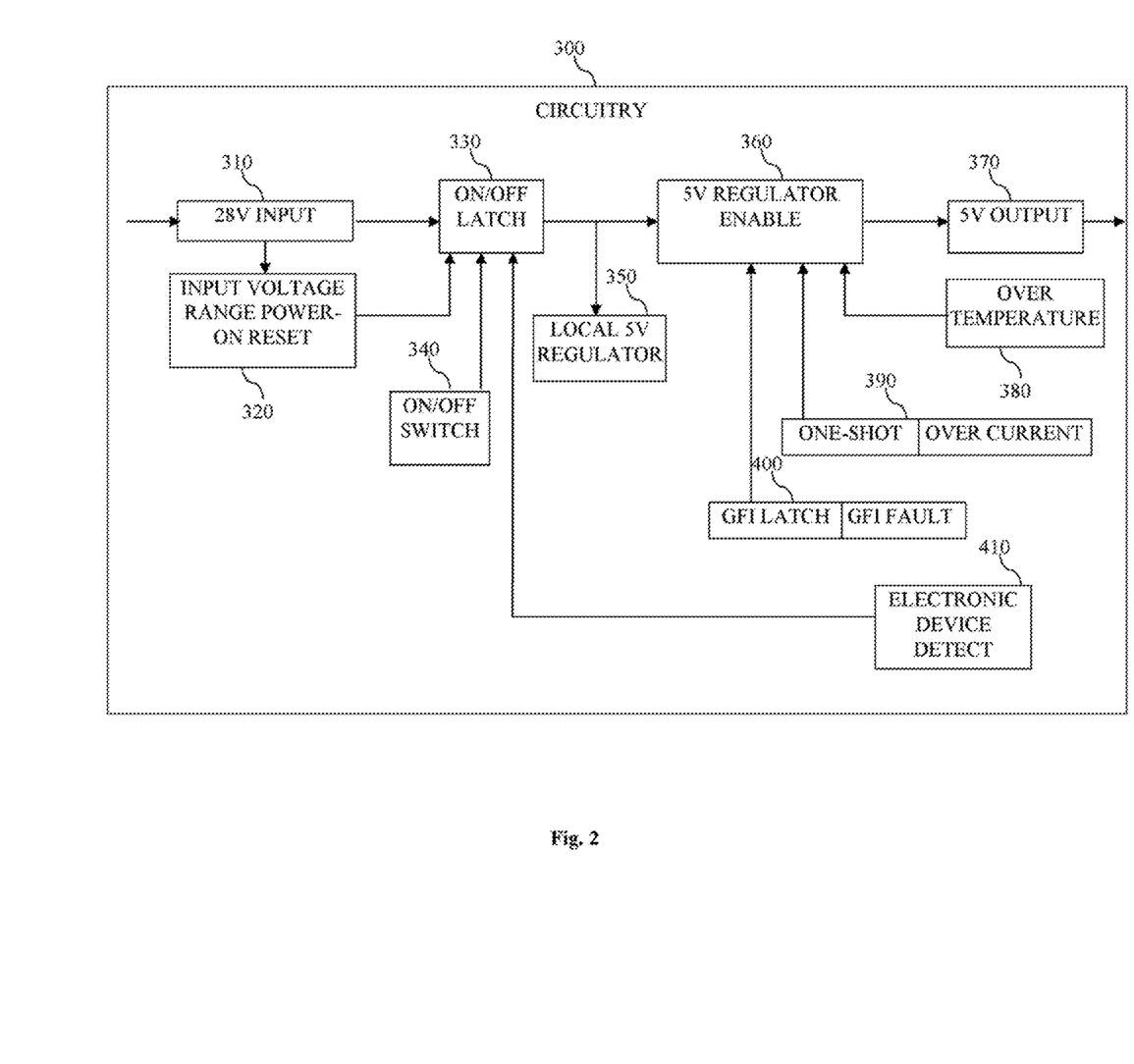
FIG. 2 is a simplified block diagram of electronic circuitry of the power conditioning module according to various aspects of the present disclosure.
Figure 3A:
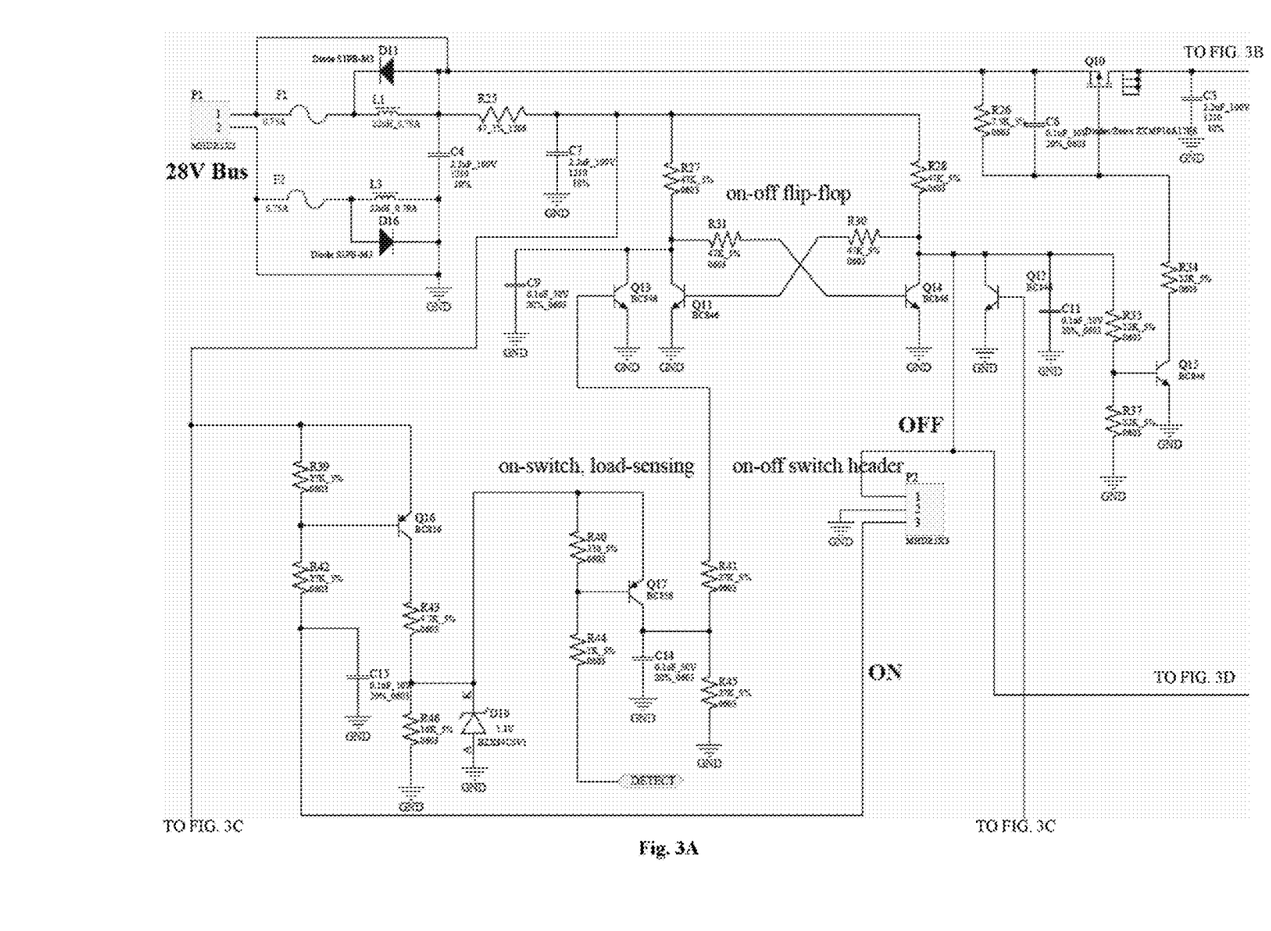
FIGS. 3-5 are circuit schematics of a power conditioning module according to an embodiment of the present disclosure.
Figure 3B:
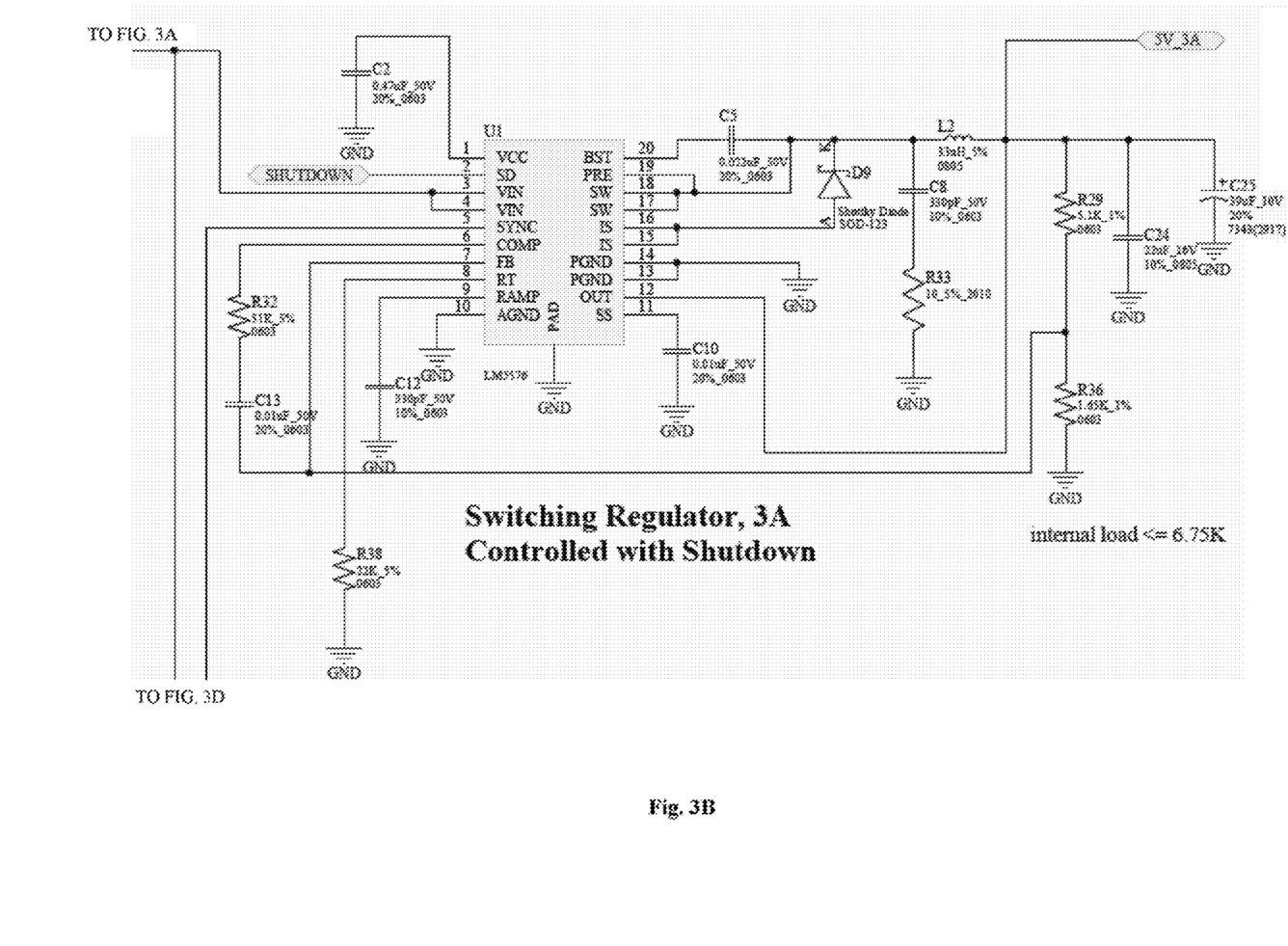
Figure 3C:
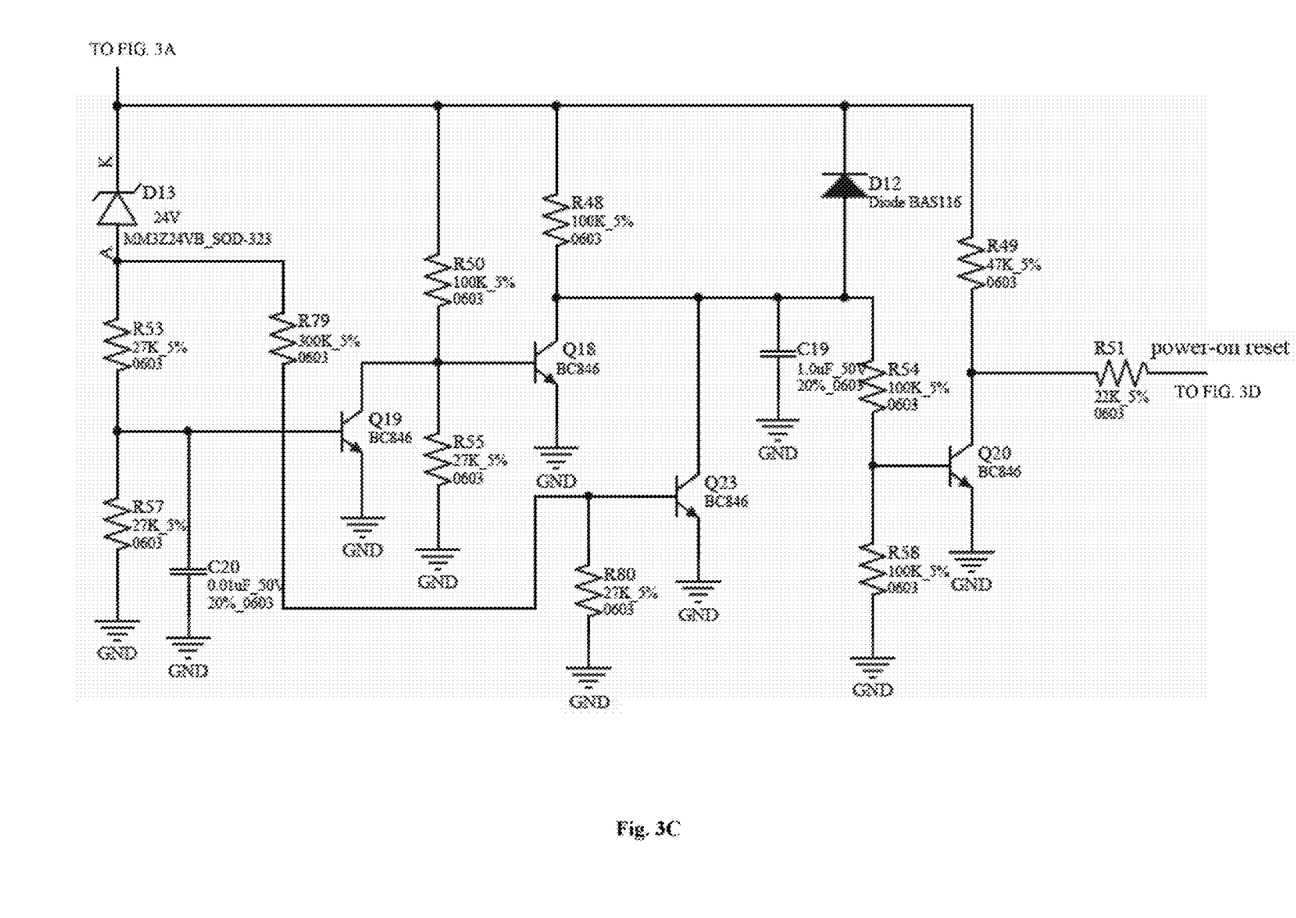
Figure 3D:
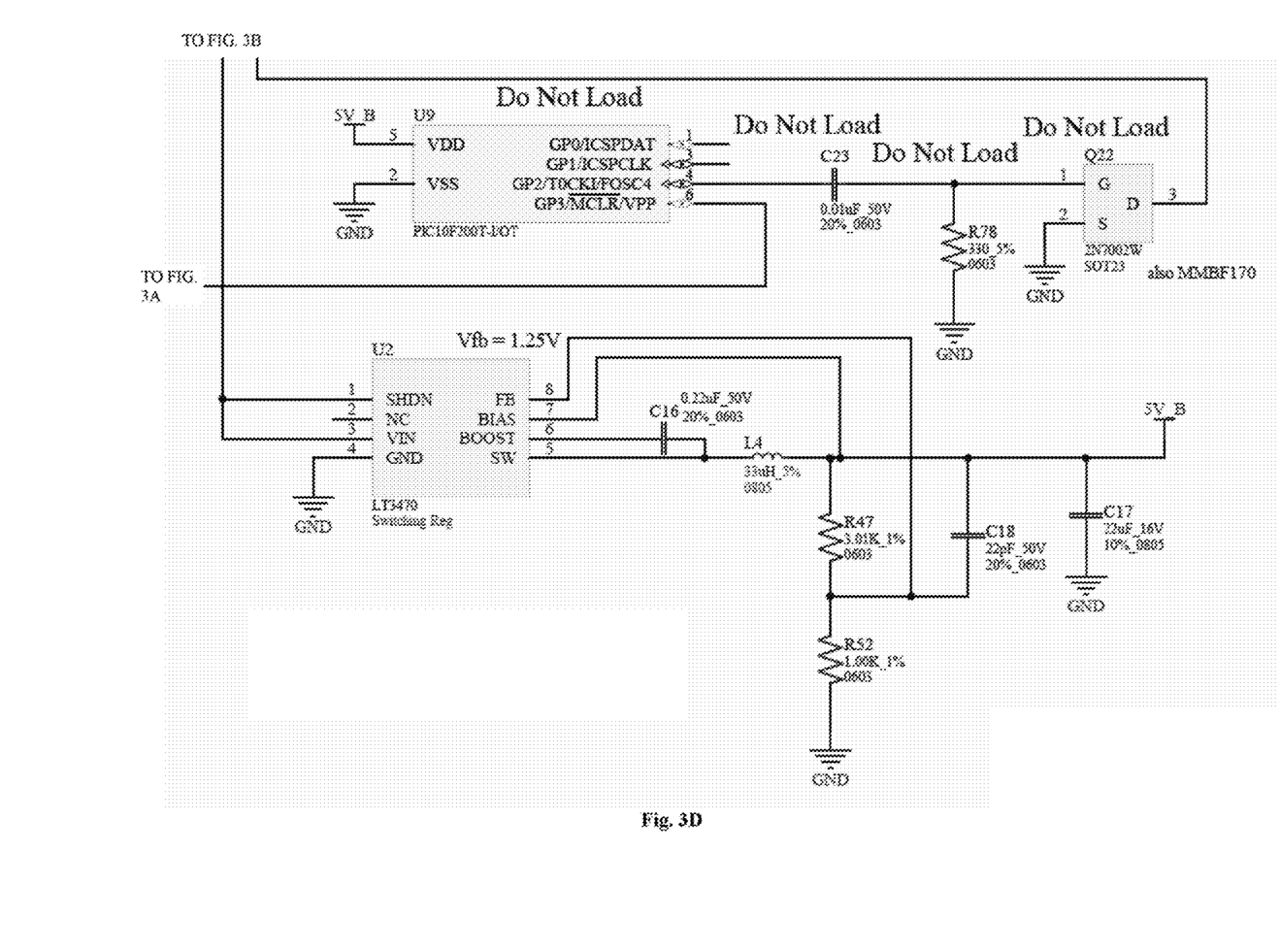
Figure 4A:
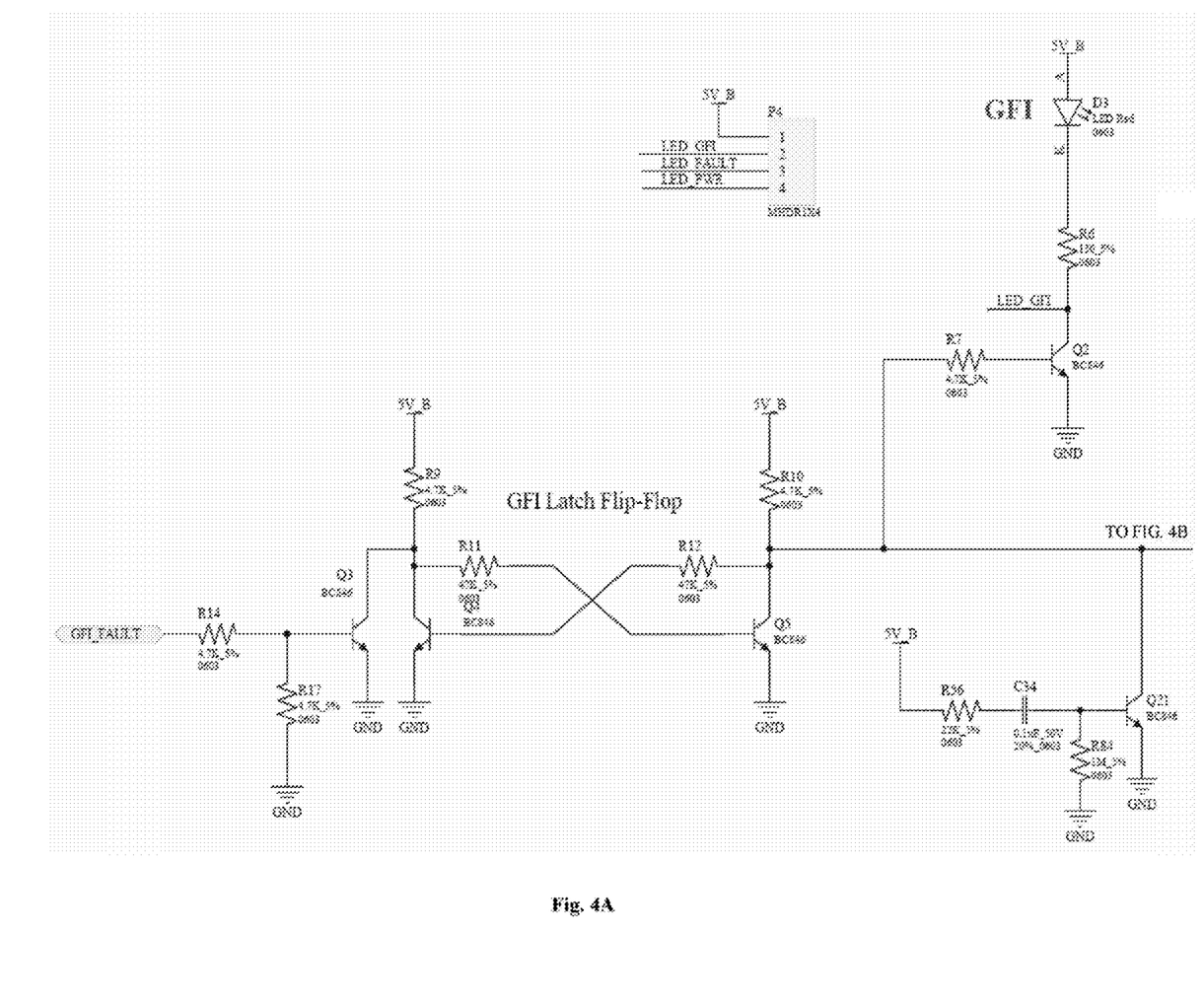
Figure 4B:
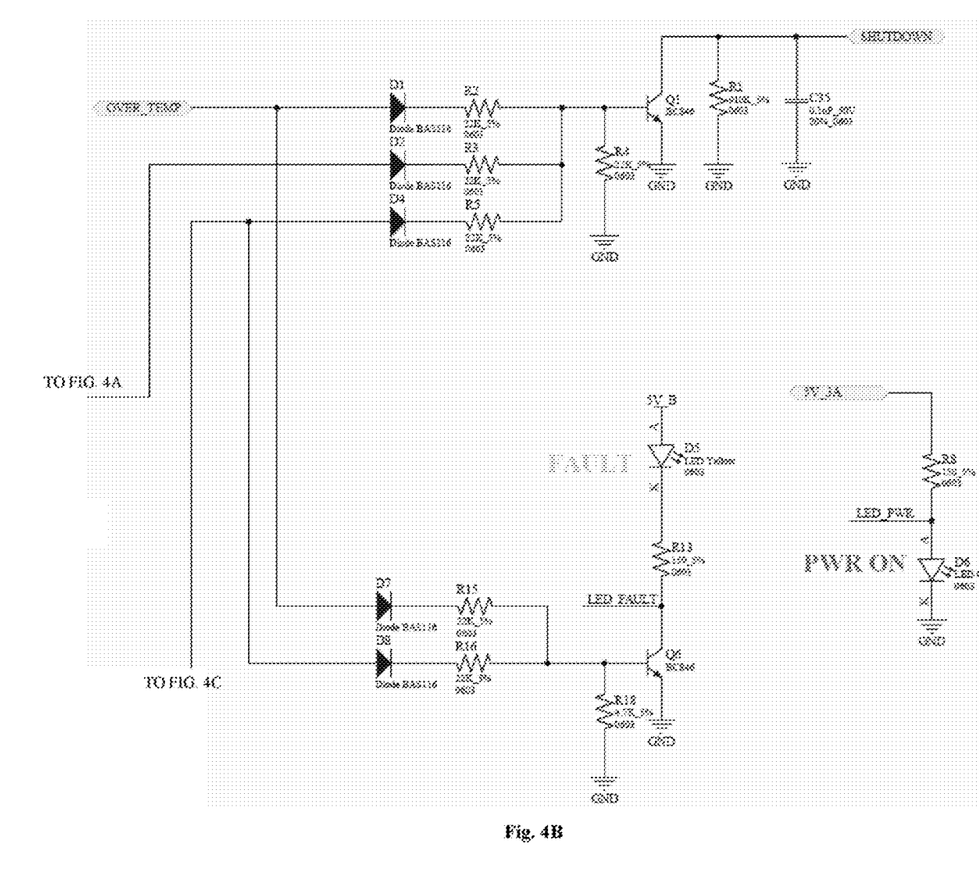
Figure 4C:
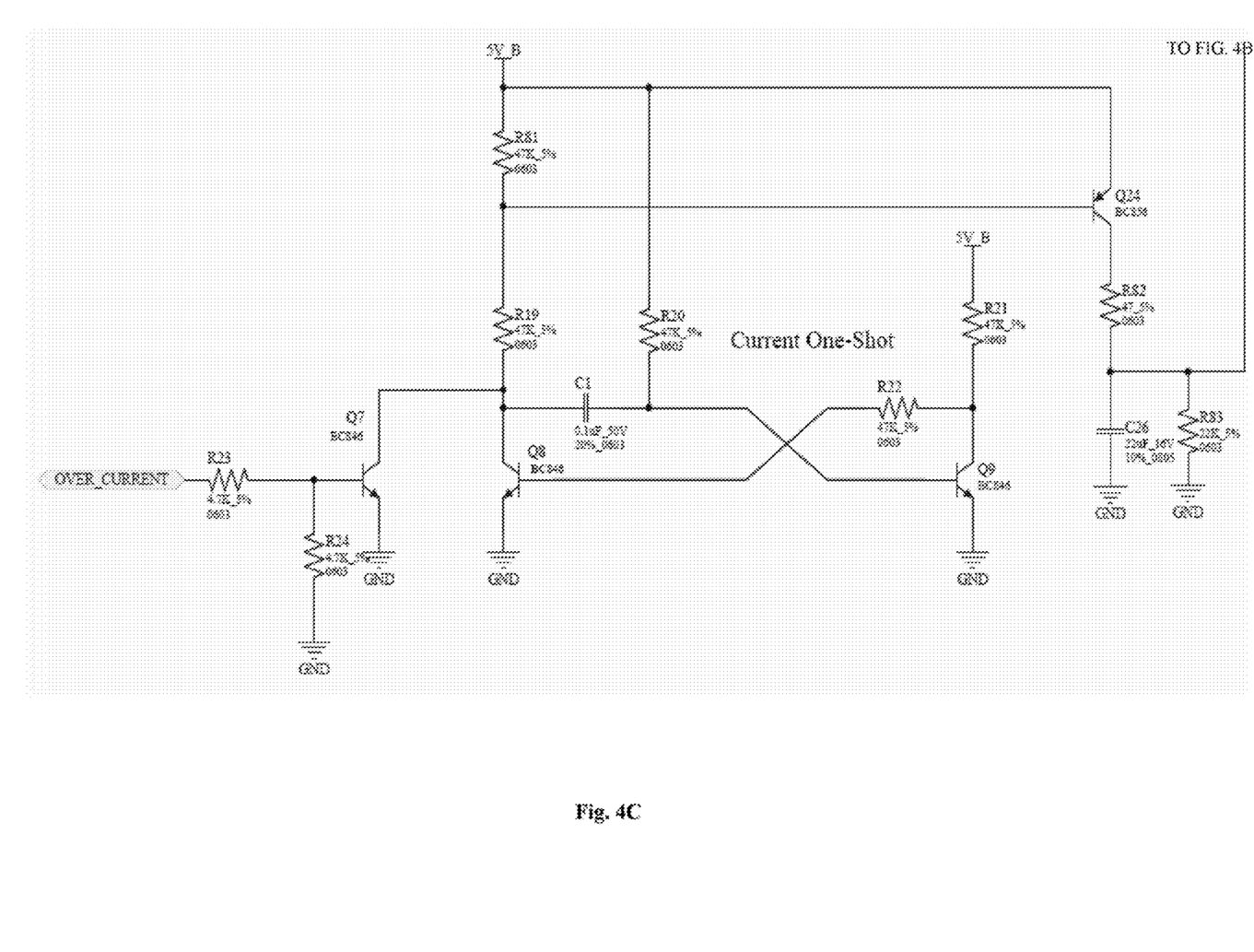
Figure 5A:
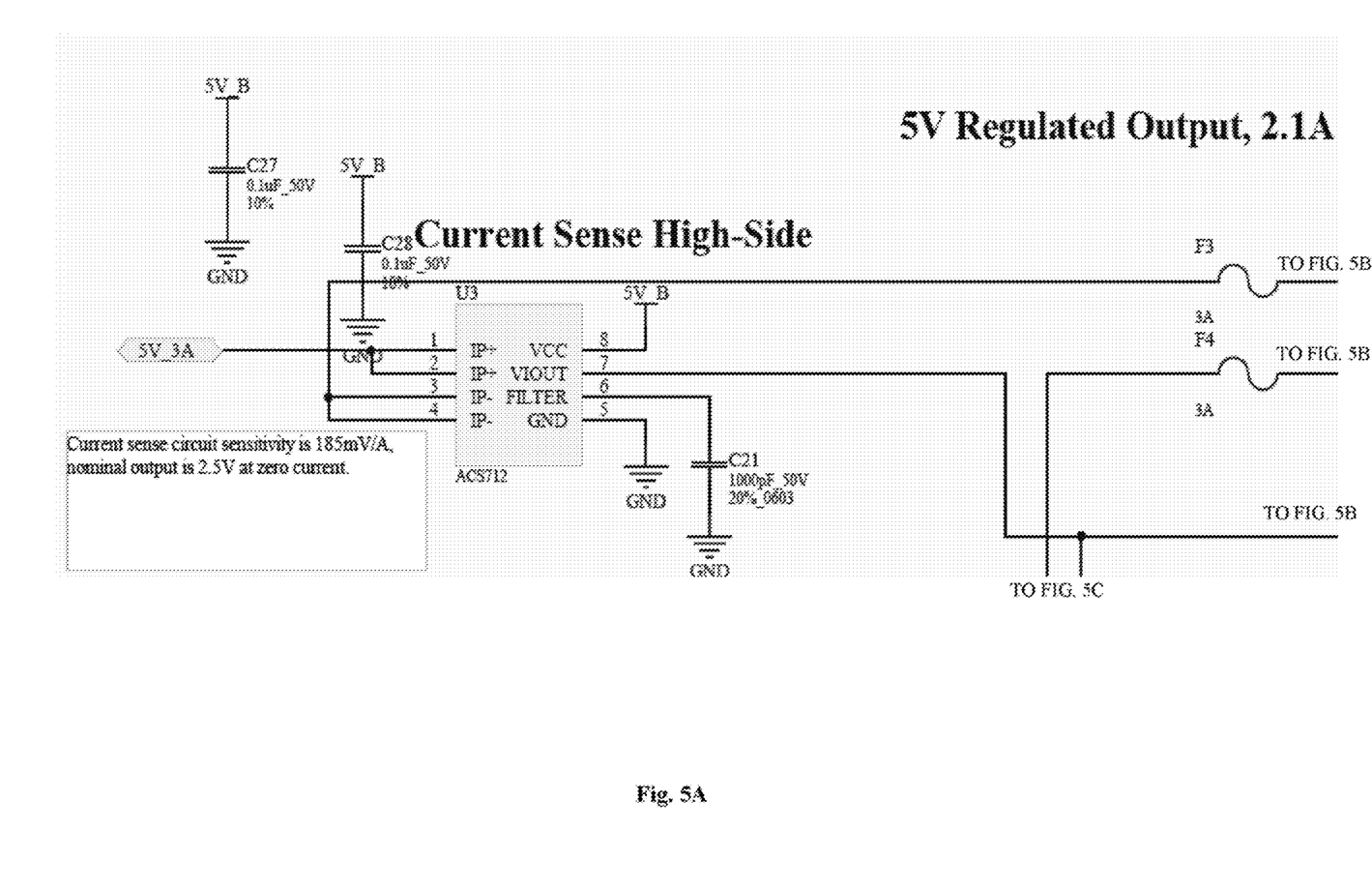
Figure 5B:
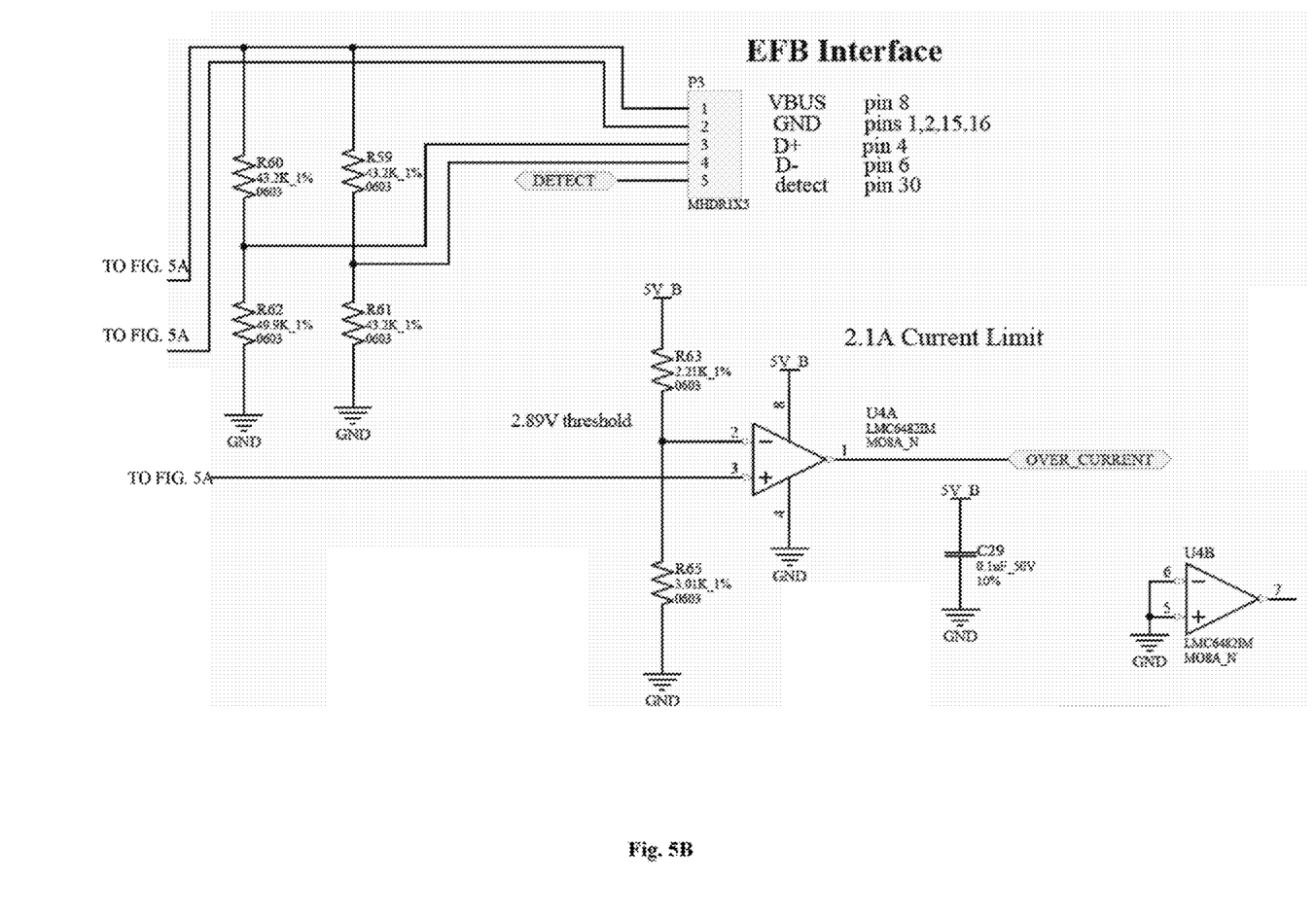
Figure 5C:
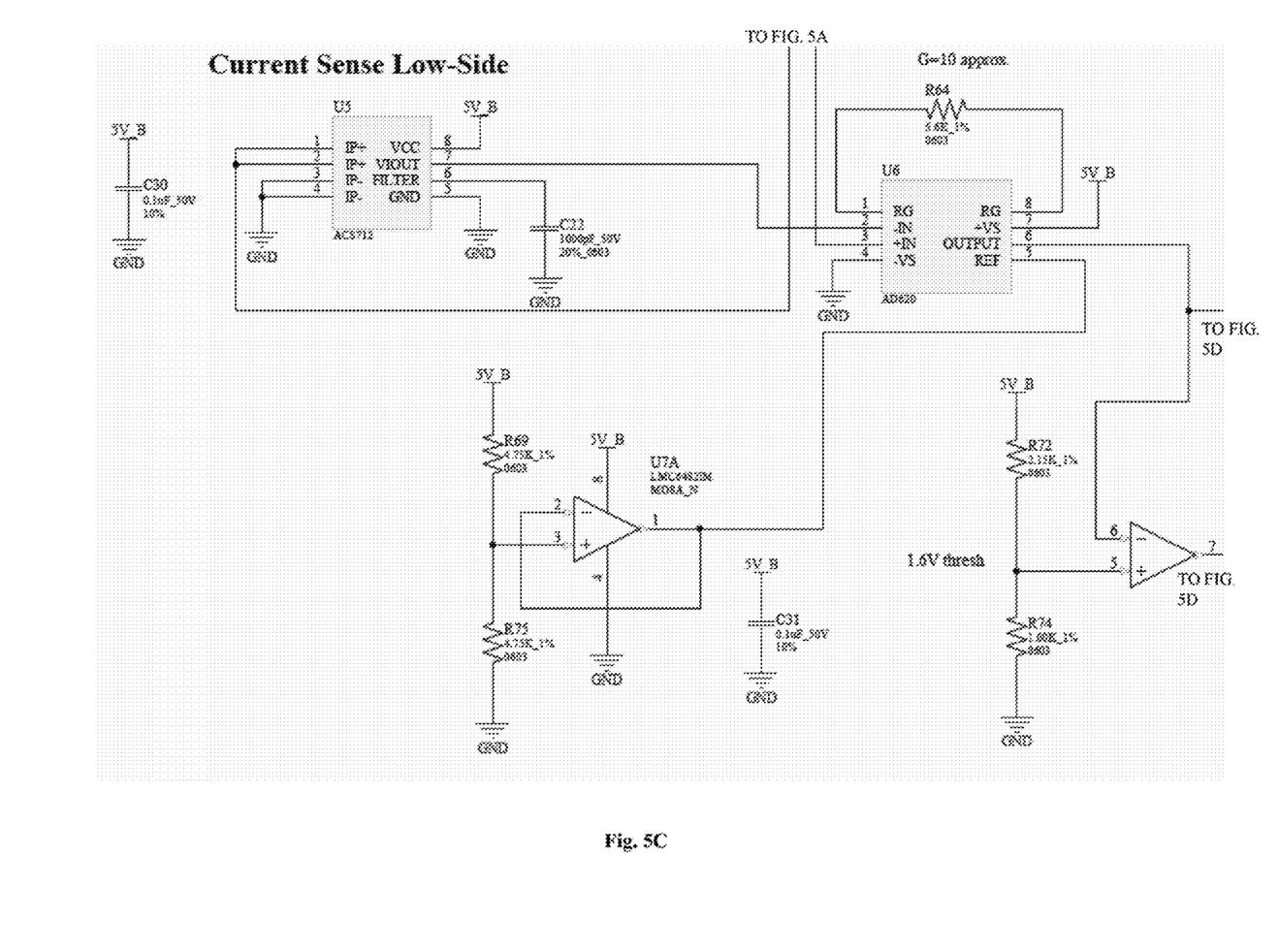
Figure 5D:
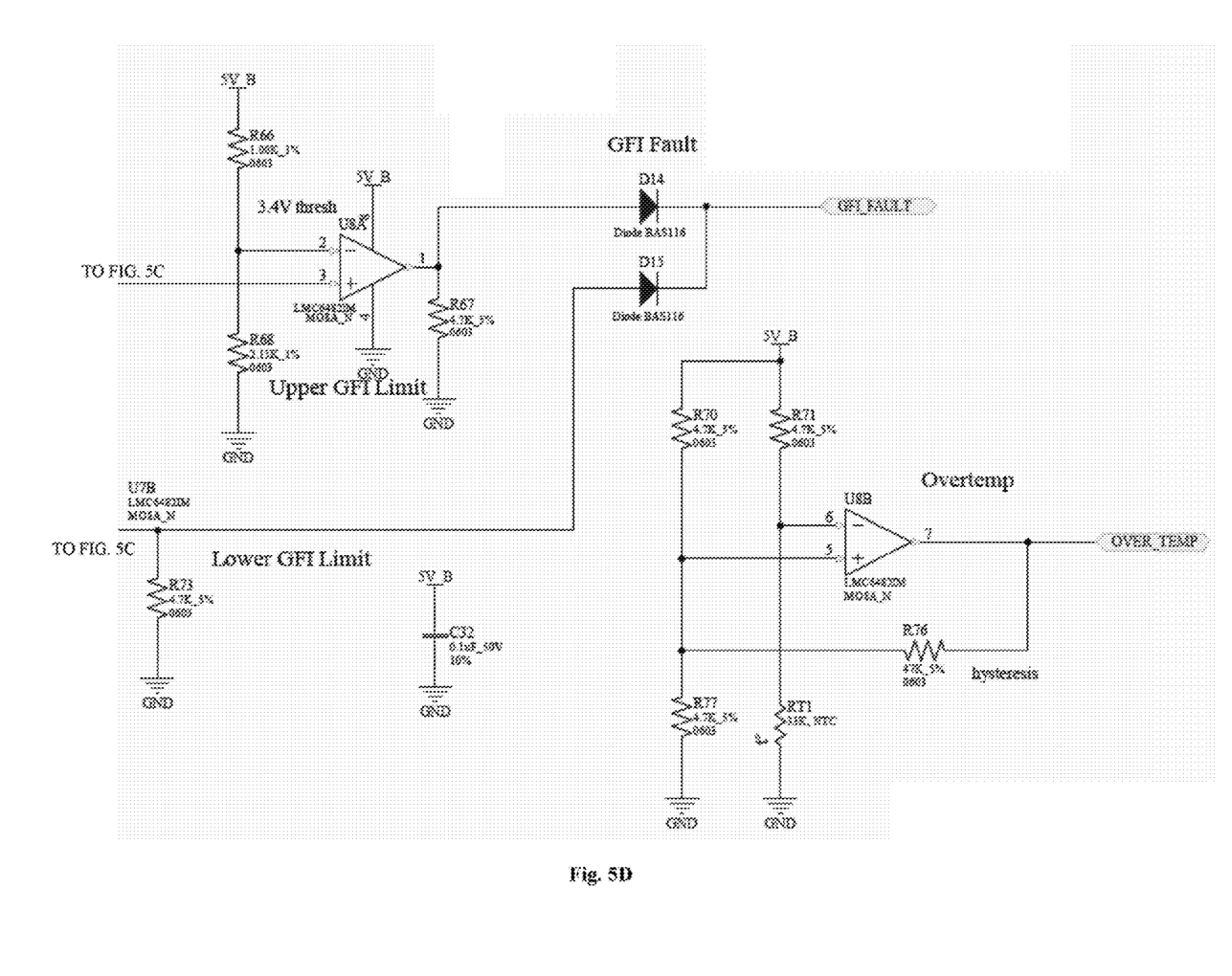

A simplified functional block diagram of the circuitry 300 is shown in FIG. 2. The circuitry 300 includes blocks 310-410, wherein each block may include one or more circuit components (or electronic devices), for example transistors, resistors, capacitors, inductors, diodes, transformers, fuses, etc. The functionalities of each of these blocks 310-410 are discussed below in more detail.

The block 310 is a 28V input block. The block 310 contains electronic circuitry that interfaces with an input power (voltage) received from an aircraft. Typically, the power generated and available from an aircraft is not steady or clean enough to be used to power an electronic device to be used as an electronic flight bag. For example, for many commercial planes, though they may be designed to provide a 28V voltage output, their actual voltage output may vary from about 22V to about 32V. This voltage output may be accompanied by frequent voltage bursts as well. Thus, to handle this dirty voltage, the block 310 may contains voltage buffers and other interfacing circuitry that minimizes the adverse impacts of the voltage fluctuations and spikes.

The block 320 is an input voltage range power-on reset block. The block 320 contains electronic circuitry that monitors the input power and provides a notification to a user or operator in case the input power behaves irregularly. For example, the block 320 may be operable to monitor the input power (e.g., voltage from the aircraft) and determine whether it is within a predetermined threshold range. If the input power falls outside this predetermined threshold range, then the block 320 may notify the user that the input power has exceeded the threshold, and may require the user to take action to address this problem, for example shutting down the output and reinitializing the load.

The block 330 is an on/off latch block. In one embodiment, the block 330 contains a handheld switch mechanism. In another embodiment, the block 330 contains an external illuminated switch enunciator mechanism. It is understood that the handheld switch mechanism and the switch enunciator mechanism may each be implemented outside the circuitry 300 as physically separate devices. The block 330 includes a momentary-on, a momentary-reset and a momentary-off. Momentary-on and momentary-reset may be accomplished by pushing the switch to a forward position. Momentary-off is accomplished by bringing the switch back to a middle position. The block 330 includes one or more common anodes that are operable to sense the momentary switching of the switch (or switch command) and latches (or holds) the command.

The block 340 corresponds to an on/off switch. In one embodiment, the switch is implemented outside the circuitry 300. If a box form factor is used for the power conditioning module, there is a switch enunciator on the panel, the switch enunciator is a logic switch and contains logic circuitry and LED devices. The illumination of the LED devices informs the operator or user of the system's status. For example, if the LED devices illuminate a red light, then that indicates a hard fail or fault. If the LED devices illuminate a yellow or amber light, then that indicates a resettable fail. If the handheld form factor is used for the power conditioning module, then the switch is a mechanical switch. It's a momentary normally open double-pole-double-throw switch.

The block 350 is a local 5V regulator block. This block provides power for the board. The block 350 regulates power for the components on the power conditioning module.

The block 360 is a 5V regulator block. If all the interlocks are met by the board and the load device and the input power, then the block 360 allows the user to enable the output.

The block 370 is a 5V output block. The block 370 outputs a steady 5V DC voltage output. The block 370 includes sense elements for sensing the 5V DC output and a 2.1 A current output with a predetermined variance. If the voltage or current output is outside a predetermined range (for example, greater than 3% of 2.1 A for the current output), then the output will not be allowed to go out.

The block 380 is an over-temperature block. The block 380 is for handling the over-temperature condition of the power conditioning module itself. If heat is being dissipated too quickly, or not quickly enough so that the device is getting overheated, it will shut the device down as opposed to the output. Thus, it protects the aircraft wiring.

The block 390 is a one-shot/over-current block. When the output is applied, there is an associated voltage drop once power is applied. The block 390 ensures that there is enough off board voltage to keep it from cycling on and off. The block 390 offers the ability to keep power steady long enough to stabilize the output once the output power is applied. In this manner, the power conditioning module will not automatically shut down.

The block 400 is a GFI latch/GFI fault block. A GFI fault is a hard failure, which will shut down the device and gives a red LED indication. The GFI fault requires the user to disconnect the load and reconnect the load before the device is turned back on.

The block 410 is an electronic device detect block. The block 410 senses the load device. If there is no load present, then it will not allow power to be applied through the output. The block 410 ensures that there would not be a plug floating in the cockpit of an aircraft with power on it. In an embodiment, the block 410 is designed and configured to sense an Apple iPad device as a load device.

FIGS. 3A-3D, FIGS. 4A-4C, and FIGS. 5A-5D are circuit schematic drawings of the power conditioning module 100 according to an embodiment. The power conditioning module 100 provides an indication and a shunt in the event of an error in an aviation application. As discussed before, the embodiment of the power conditioning module implemented according to the circuit schematics shown in FIGS. 3-5 is configured to clean up a dirty existing power supply from an aircraft and convert this power to a steady power that can be used to charge a portable electronic device such as an Apple iPad device, which can be used as an electronic flight bag. The voltage supplied by the power conditioning module is substantially free of voltage fluctuations or spikes. The power conditioning module accounts for over-voltage, under-voltage, over-current, and under-current situations, as well as thermal conditions on the circuit that can lead to thermal runaway situations. The existence or triggering of these conditions may be communicated to an operator through an LED panel that is implemented on the power conditioning module. The LED panel may illuminate different colors of light depending on the fault conditions. In the embodiment illustrated in FIGS. 3-5, the components of the power conditioning module are implemented using physical hardware devices (as opposed to software code). The power conditioning module 100 meets the stringent standards set forth by government rules and regulations regarding the airworthiness of a power conditioning module that is qualified to be used in an aircraft.

Figure 6:
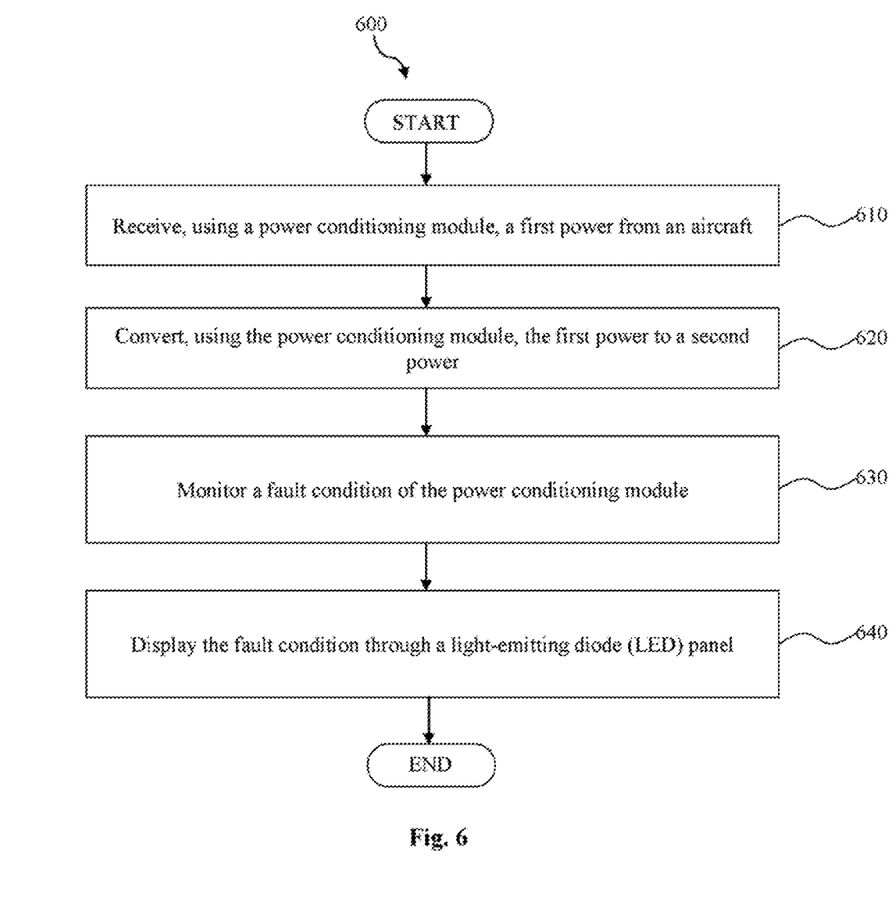
FIG. 6 is a flowchart illustrating a method for conditioning a power from an aircraft according to various aspects of the present disclosure.

FIG. 6 is a flowchart illustrating a method 600 of conditioning a power from an aircraft according to various aspects of the present disclosure. The method 600 includes step 610 in which a power conditioning module is used to receive a first power from an aircraft. The method 600 includes steps 620 in which the power conditioning module is used to convert the first power into a second power. The second power is different from the first power and is suitable for charging a portable electronic device. The portable electronic device may be a computer tablet device, for example an Apple iPad device. The method 600 includes steps 630 in which a fault condition of the power conditioning module is monitored. The method 600 includes step 640 in which the fault condition is displayed through a light-emitting diode (LED) panel. It is understood that additional steps may be performed before, during, or after the steps 610-640 of FIG. 6. For example, the method 600 may include using the power conditioning module to charge the portable electronic device.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:
1. An apparatus, comprising:
a power conditioning module that includes:
an input that is operable to receive a first power from an aircraft;
electronic circuitry that is operable to transform the first power to a second power, wherein the second power is different from the first power and is suitable for charging a portable electronic device, wherein the portable electronic device serves as an electronic flight bag for the aircraft; and
a status indication mechanism that is operable to indicate a status of the power conditioning module visually to an operator in a manner such that each status of the power conditioning module is associated with a different visual appearance of the status indication mechanism.

2. The apparatus of claim 1, wherein the status indication mechanism includes a plurality of light-emitting diodes (LEDs), and wherein each LED is configured to illuminate a different color of light to indicate a respective one of a plurality of fault conditions.

3. The apparatus of claim 1, wherein the fault conditions include: an over-voltage condition, an under-voltage condition, an over-current condition, an under-current condition, an over-temperature condition, and a ground fault interrupter condition.

4. The apparatus of claim 1, wherein the first power is a voltage generated by the aircraft and contains voltage fluctuations, and wherein the second power is a steady direct-current (DC) voltage that is substantially free of voltage fluctuations.

5. The apparatus of claim 1, wherein the electronic circuitry is free of a micro-controller.

6. The apparatus of claim 1, wherein the power conditioning module has a form factor that is a box-enclosed mount device that is configured to be permanently mounted to a cockpit of the aircraft.

7. The apparatus of claim 1, wherein the power conditioning module has a form factor that is a portable dongle.

8. The apparatus of claim 1, wherein the power conditioning module further includes at least one of:
a detect pin that is electrically coupled to the electronic circuitry and configured to identify the power conditioning module as a power accessory to the portable electronic device attached thereto; and
one or more data pins configured to prevent the power conditioning module from being turned on if no portable electronic device is coupled to the power conditioning module.

9. A method, comprising:
receiving, using a power conditioning module, a first power from an aircraft;
converting, using the power conditioning module, the first power to a second power, wherein the second power is different from the first power and is suitable for charging a portable electronic device configured to serve as an electronic flight bag for the aircraft;
monitoring a health status of the power conditioning module; and
displaying the health status through a light-emitting diode (LED) panel, wherein the displaying includes presenting the LED panel under a plurality of visual appearances to an operator, wherein each of the plurality of visual appearances corresponds to a different type of health status of the power conditioning module.

10. The method of claim 9, wherein the LED panel contains a plurality of LED devices configured to illuminate different colors of light that correspond to different fault conditions.

11. The method of claim 10, wherein the fault conditions include: an over-voltage condition, an under-voltage condition, an over-current condition, an under-current condition, an over-temperature condition, and a ground fault interrupter condition.

12. The method of claim 9, wherein the first power is a voltage generated by the aircraft and contains voltage spikes, and wherein the second power is a steady direct-current (DC) voltage that is substantially free of voltage spikes.

13. The method of claim 9, wherein the power conditioning module has a form factor that is a box-enclosed mount device that is configured to be permanently mounted to a cockpit of the aircraft.

14. The method of claim 9, wherein the power conditioning module has a form factor that is a portable dongle.

15. The method of claim 9, further including charging the portable electronic device using the power conditioning module.

16. The method of claim 9, further comprising: identifying the power conditioning module as a power accessory to the portable electronic device.

17. A power conditioning system, comprising:
input means for receiving a first power from an aircraft;
electronic circuitry means for transforming the first power to a second power, wherein the second power is different from the first power and is suitable for charging a portable electronic device configured to function as an electronic flight bag for the aircraft; and
display means for visually displaying a health status of the power conditioning module to an operator in a manner so that different health statuses of the power conditioning module are accompanied by different visual presentations.

18. The power conditioning system of claim 17, wherein the display means includes light-emitting means for illuminating different colors of light to indicate a plurality of different fault conditions of the power conditioning module.

19. The power conditioning system of claim 17, wherein the electronic circuitry means is configured to convert a direct-current (DC) voltage that contains spikes to a DC voltage that is substantially free of voltage spikes.

20. The power conditioning system of claim 17, wherein:
the electronic circuitry means includes means for identifying the power conditioning system as a power accessory to the portable electronic device; and
the input means, the electronic circuitry means, and the display means are housed within an enclosure having a form factor that is one of: a box-enclosed device mounted to a cockpit of the aircraft, and a portable dongle.

* * * * *